(12) United States Patent
Gordon et al.

(10) Patent No.: US 6,995,748 B2
(45) Date of Patent: Feb. 7, 2006

(54) APPARATUS FOR CONTROLLING A SCREEN POINTER WITH A FRAME RATE BASED ON VELOCITY

(75) Inventors: Gary B. Gordon, Saratoga, CA (US); Michael J. Brosnan, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 345 days.

(21) Appl. No.: 10/338,257

(22) Filed: Jan. 7, 2003

(65) Prior Publication Data

US 2004/0130532 A1 Jul. 8, 2004

(51) Int. Cl.
*G09G 5/08* (2006.01)

(52) U.S. Cl. ...................................... 345/166; 345/159
(58) Field of Classification Search ................ 345/156, 345/157, 158, 159, 163, 164, 165, 166
See application file for complete search history.

(56) References Cited

U.S. PATENT DOCUMENTS

| | | | |
|---|---|---|---|
| 4,847,484 A * | 7/1989 | Kikuchi | ...................... 250/221 |
| 5,578,813 A | 11/1996 | Allen et al. | |
| 5,644,139 A * | 7/1997 | Allen et al. | .................. 250/557 |
| 5,710,574 A * | 1/1998 | Jaaskelainen, Jr. | .......... 715/856 |
| 5,786,804 A | 7/1998 | Gordon | |
| 5,994,710 A * | 11/1999 | Knee et al. | .................. 250/557 |
| 6,057,540 A | 5/2000 | Gordon et al. | |
| 6,151,015 A | 11/2000 | Badyal et al. | |
| 6,281,882 B1 | 8/2001 | Gordon et al. | |
| 6,455,840 B1 * | 9/2002 | Oliver et al. | ............. 250/222.1 |
| 6,552,713 B1 * | 4/2003 | Van Brocklin et al. | ..... 345/157 |
| 6,781,570 B1 * | 8/2004 | Arrigo et al. | ............... 345/158 |

\* cited by examiner

*Primary Examiner*—Patrick N. Edouard
*Assistant Examiner*—Jean Lesperance (57) ABSTRACT

An apparatus for controlling the position of a screen pointer for an electronic device having a display screen includes a light source for illuminating an imaging surface, thereby generating reflected images. An optical motion sensor generates digital images from the reflected images at a first frame rate. The motion sensor is configured to generate movement data based on the digital images. The movement data is indicative of relative motion between the imaging surface and the apparatus. The motion sensor is configured to modify the first frame rate to one of a plurality of alternate frame rates based on a current relative velocity between the imaging surface and the apparatus.

25 Claims, 4 Drawing Sheets

APPARATUS FOR CONTROLLING A SCREEN POINTER WITH A FRAME RATE BASED ON VELOCITY

THE FIELD OF THE INVENTION

This invention relates generally to devices for controlling a pointer on a display screen, and relates more particularly to an apparatus for controlling a screen pointer with a frame rate based on velocity.

BACKGROUND OF THE INVENTION

The use of a hand operated pointing device for use with a computer and its display has become almost universal. One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mechanical mouse, optical pointing devices have also been developed. In one form of an optical pointing device, rather than using a moving mechanical element like a ball, relative movement between an imaging surface, such as a finger or a desktop, and photo detectors within the optical pointing device, is optically sensed and converted into movement information. Battery operated optical mice are currently available based on Agilent's ADNS-2020 and ADNS-2030 optical image sensors. Other optical mice are available based on Agilent's ADNS-2001 and ADNS-2051, as well as other optical image sensors.

Limiting the power consumed by optical pointing devices is important for portable electronic devices, such as portable computers, cellular telephones, personal digital assistants (PDA's), digital cameras, portable game devices, pagers, portable music players (e.g., MP3 players), and other similar devices that might incorporate an optical pointing device. Limiting power consumption is also important for wireless optical pointing devices, such as wireless optical mice.

One major source of power drain in optical pointing devices is the light source typically used in these devices. For an optical mouse, the light source, such as a light emitting diode (LED), illuminates the surface under the mouse. While the mouse is moved, the LED is typically turned on at a constant frequency based on the frame rate of the optical motion sensor. Several techniques have been developed to reduce the power drain caused by the light source. For example, some optical motion sensors for optical pointing devices include a low-power or "sleep" mode that is automatically entered if no motion is detected for a period of time. In low power mode, power savings is achieved by turning off the light source of the optical pointing device, or turning the light on less frequently than in full power mode. In low power mode, the sensor typically does not measure how much motion occurs, but rather determines whether any motion has occurred. When motion is detected, the sensor reverts back to a full power mode with a higher frame rate appropriate for tracking motion.

In the low power mode in some optical motion sensors, images are captured, but at a significantly reduced rate compared to the rate at which images are captured in the full power mode. Some optical motion sensors provide 1500 or more "frame periods" per second. An image may or may not be captured during a frame period. For example, in full power mode, an image may be captured during each frame period, resulting in 1500 images per second. In low power mode, an image may only be captured every 10 or 12 frame periods, resulting in 125–150 images per second, or an image may only be captured every 750 to 1500 frame periods, resulting in one to two images per second.

In the full power mode of some optical motion sensors, the light source remains on for all frame periods, and is not turned off during a frame period or between frame periods. In the low power mode of some optical motion sensors, the light source is turned on only during frame periods when images are captured. Optical motion sensors have also been developed that adjust the pulse width of the light source drive signal to only turn the light source on during the integration phase of a frame period to save additional power.

In the full power mode of some optical mice, 1500 or more images are captured per second, which allows the mice to be able to track high velocity movements (e.g., 0.5 meters per second). The frame rate (e g., 1500 frames per second) in the full power mode of these mice is constant, regardless of the speed that the mouse is moved. However, the majority of mouse movements are not at high velocities, and slower movements can be accurately tracked at a slower frame rate. Excess power is consumed by tracking these slower movements at a high frame rate.

In the low power mode of some optical mice, even though a lesser number of images are typically captured per second than in a full power mode, the optical motion sensors in these devices still typically perform essentially the same analog-to-digital conversion and digital signal processing functions on the full image frames as those performed during full power mode. A relatively significant amount of power is consumed by digitizing and processing these full frames to determine whether any motion has occurred.

SUMMARY OF THE INVENTION

One form of the present invention provides an apparatus for controlling the position of a screen pointer for an electronic device having a display screen. The apparatus includes a light source for illuminating an imaging surface, thereby generating reflected images. An optical motion sensor generates digital images from the reflected images at a first frame rate. The motion sensor is configured to generate movement data based on the digital images. The movement data is indicative of relative motion between the imaging surface and the apparatus. The motion sensor is configured to modify the first frame rate to one of a plurality of alternate frame rates based on a current relative velocity between the imaging surface and the apparatus.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
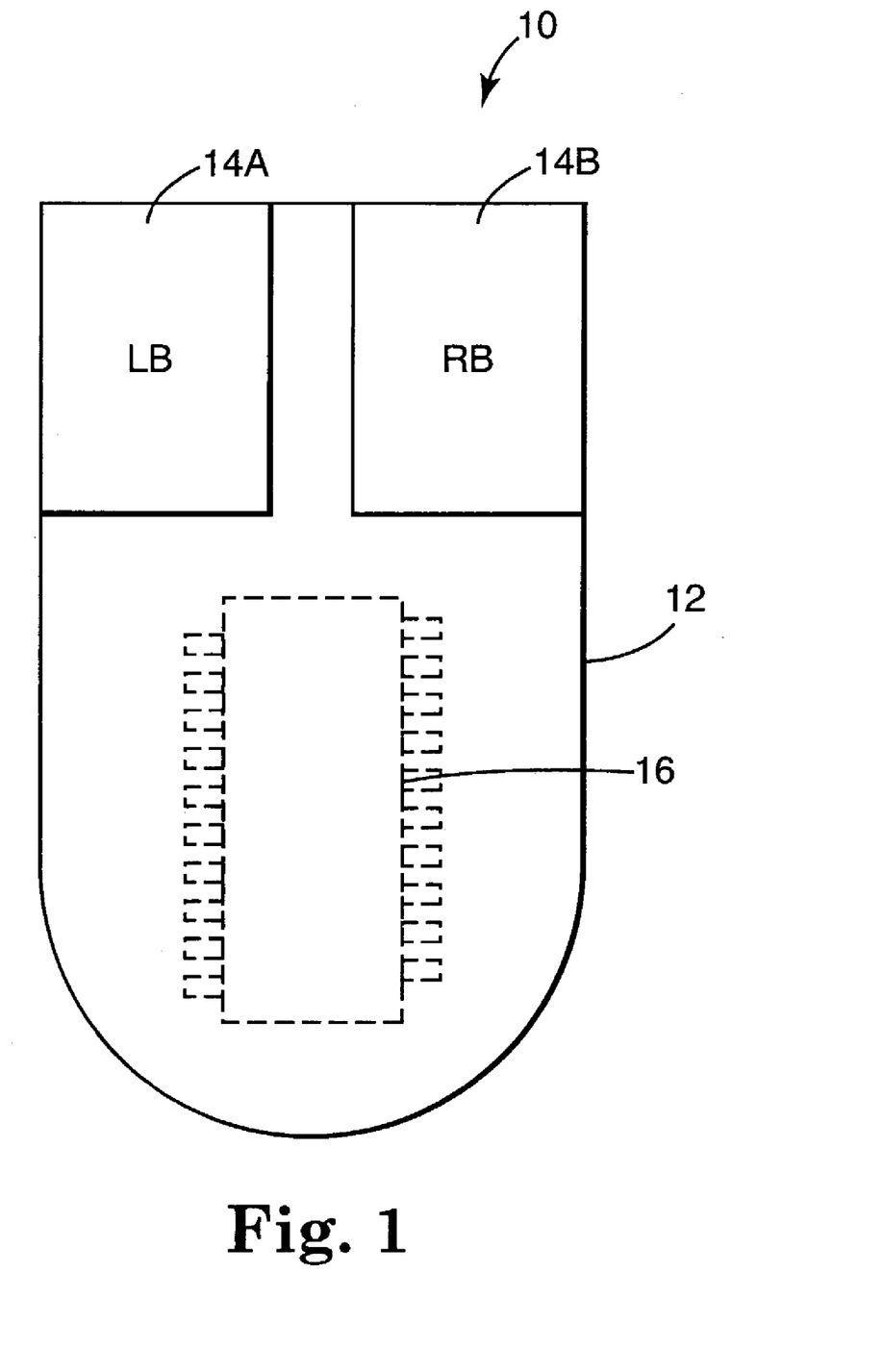
FIG. 1 is a top view of an optical mouse according to one embodiment of the present invention.

FIG. 1 is a top view of an optical mouse 10 according to one embodiment of the present invention. Mouse 10 includes plastic case 12, left mouse button (LB) 14A, right mouse button (RB) 14B, and optical motion sensor chip 16. Sensor chip 16 is covered by plastic case 12, and is therefore shown with dashed lines in FIG. 1.

Figure 2:
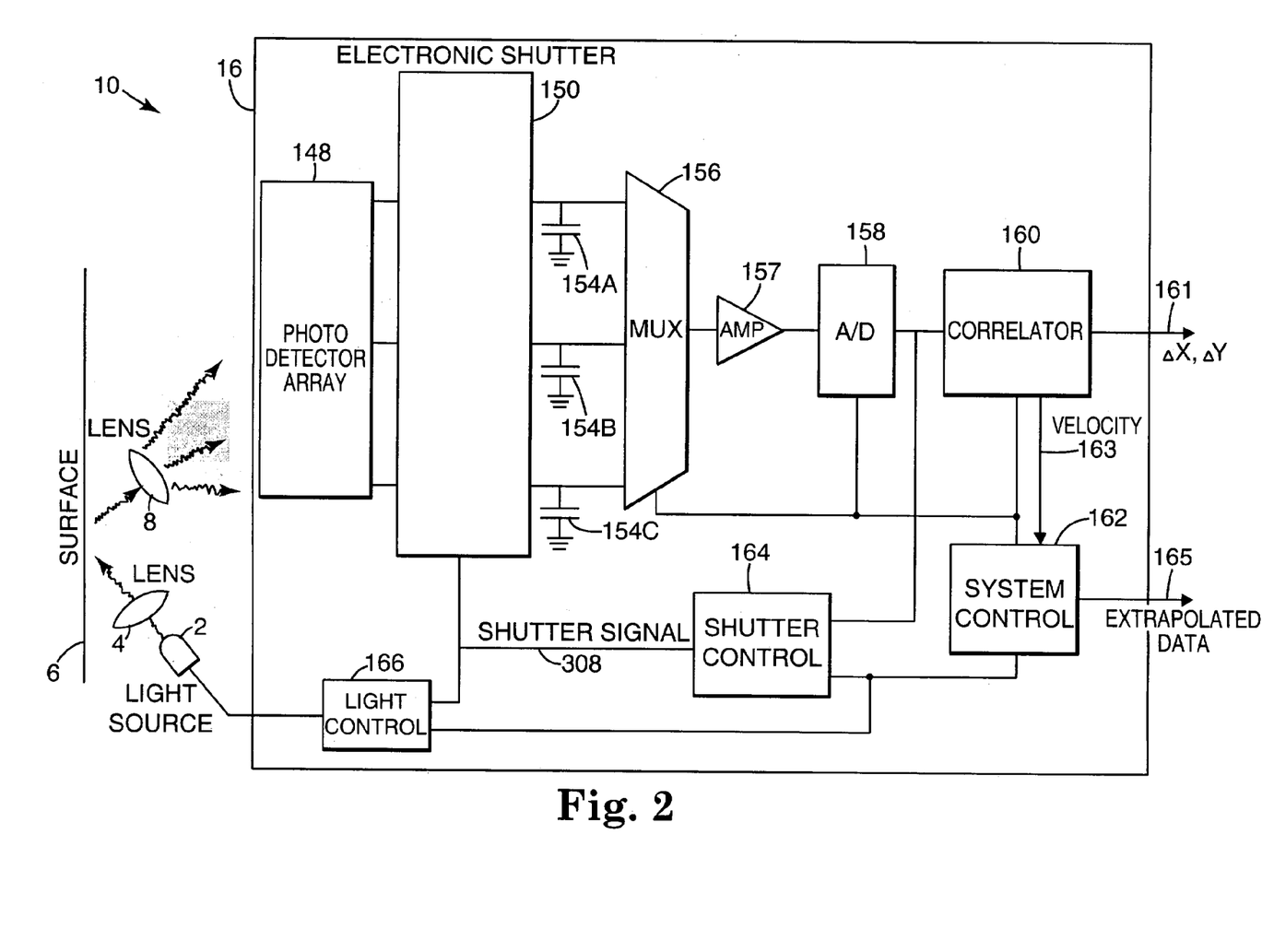
FIG. 2 is a block diagram illustrating major components of the optical mouse shown in FIG. 1 according to one embodiment of the present invention.

FIG. 2 is a block diagram illustrating major components of optical mouse 10 according to one embodiment of the present invention. Optical mouse 10 includes light source 2, lenses 4 and 8, and optical motion sensor 16. Optical motion sensor 16 includes photo detector array 148, electronic shutter 150, a plurality of sense capacitors 154A–154C (collectively referred to as sense capacitors 154), multiplexer 156, amplifier 157, analog to digital (A/D) converter 158, correlator 160, system controller 162, shutter controller 164, and light controller 166.

The operation of optical motion sensor 16 is primarily controlled by system controller 162, which is coupled to and controls multiplexer 156, A/D converter 158, correlator 160, shutter controller 164, and light controller 166. In operation, according to one embodiment, light source 2 emits light that is directed by lens 4 onto surface 6, which is a desktop or other suitable imaging surface, and reflected images are generated. In one embodiment, light source 2 includes one or more light emitting diodes (LED's). Light source 2 is controlled by signals from light controller 166. Reflected light from surface 6 is directed by lens 8 onto photo detector array 148. Each photo detector in photo detector array 148 provides a signal that varies in magnitude based upon the intensity of light incident on the photo detector.

Electronic shutter 150 is controlled by a shutter signal 308 from shutter controller 164. When electronic shutter 150 is "open," charge accumulates on sense capacitors 154, creating voltages that are related to the intensity of light incident on the photo detectors in array 148. When electronic shutter 150 is "closed," no further charge accumulates or is lost from sense capacitors 154. Multiplexer 156 connects each sense capacitor 154 in turn to amplifier 157 and A/D converter 158, to amplify and convert the voltage from each sense capacitor 154 to a digital value. Sense capacitors 154 are then discharged through electronic shutter 150, so that the charging process can be repeated.

Based on the level of voltage from sense capacitors 154, A/D converter 158 generates a digital value of a suitable resolution (e.g., one to eight bits) indicative of the level of voltage. The digital values represent a digital image or digital representation of the portion of the desktop or other imaging surface under optical mouse 10. The digital values are stored as frames within correlator 160.

In addition to providing digital images to correlator 160, A/D converter 158 also outputs digital image data to shutter controller 164. Shutter controller 164 helps to ensure that successive images have a similar exposure, and helps to prevent the digital values from becoming saturated to one value. Shutter controller 164 checks the values of digital image data and determines whether there are too many minimum values or too many maximum values. If there are too many minimum values, controller 164 increases the charge accumulation time of electronic shutter 150. If there are too many maximum values, controller 164 decreases the charge accumulation time of electronic shutter 150.

The overall size of photo detector array 148 is preferably large enough to receive an image having several features. Images of such spatial features produce translated patterns of pixel information as optical mouse 10 moves over a surface. The number of photo detectors in array 148 and the frame rate at which their contents are captured and digitized cooperate to influence how fast optical mouse 10 can be moved across a surface and still be tracked. Tracking is accomplished by correlator 160 by comparing a newly captured sample frame with a previously captured reference frame to ascertain the direction and amount of movement.

In one embodiment, the entire content of one of the frames is shifted by correlator 160 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by correlator 160 on a pixel by pixel basis, and the resulting differences are preferably squared and then summed to form a measure of similarity (correlation) within that region of overlap. In another embodiment, larger trial shifts (e.g., two over and one down) may be used. The trial shift with the least difference (greatest correlation) can be taken as an indication of the motion between the two frames. That is, it provides raw movement information that may be scaled and or accumulated to provide movement information ($\Delta X$ and $\Delta Y$) 161 of a convenient granularity and at a suitable rate of information exchange, which is output to a host device.

Figure 3:
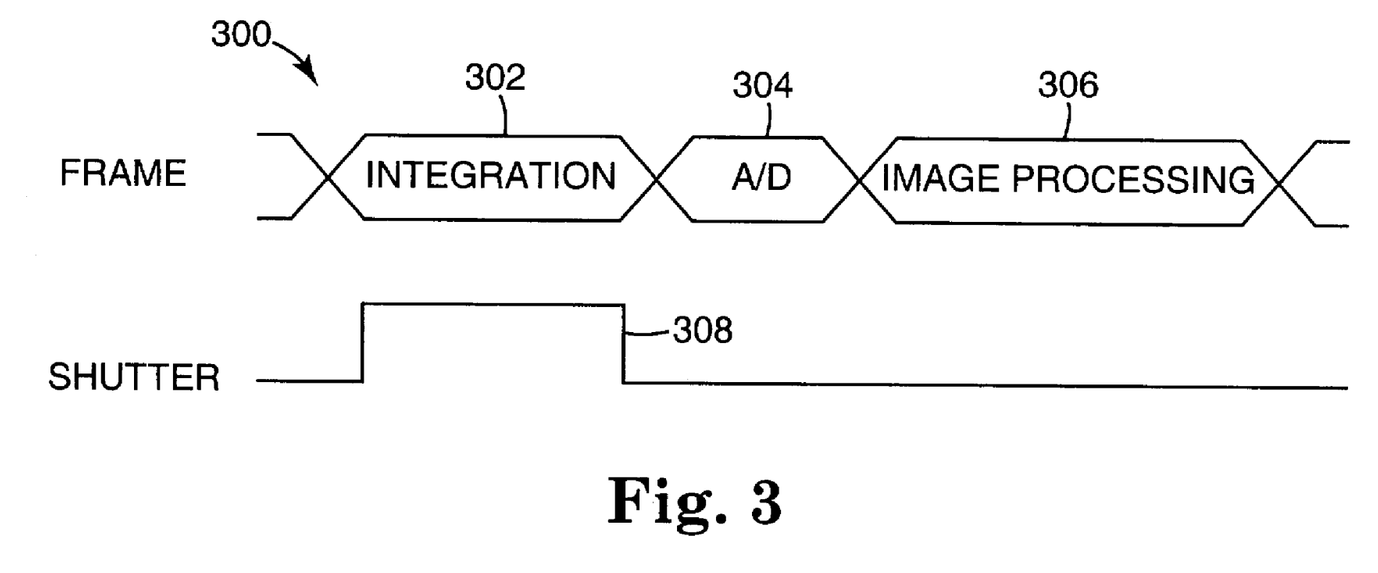
FIG. 3 is a timing diagram illustrating phases of a frame period according to one embodiment of the present invention.

FIG. 3 is a timing diagram illustrating phases of a frame period 300 according to one embodiment of the present invention. A frame period represents the time provided for capturing a frame of image data, and for analyzing the image data to determine movement information. Image data need not be captured every frame period. For example, in one embodiment, when optical mouse 10 is in a low power mode, image information may only be captured every ten or twelve frame periods. In one embodiment, in a low power mode, a single pixel in sensor array 148 is used to detect motion, as described in further detail below. In one form of the invention, when optical mouse 10 is in a full power mode, images are captured at a variable rate based on the current velocity of mouse 10, as described in further detail below.

Frame period 300 includes three phases—an integration phase 302, an analog to digital (A/D) conversion phase 304, and an image processing phase 306. During integration phase 302, light is "collected" by photo detector array 148, and charge accumulates on sense capacitors 154. During A/D conversion phase 304, the collected charge from sense capacitors 154 is converted into digital data by A/D converter 158. During image processing phase 306, correlator 160 processes the digital image data and generates incremental ΔX, ΔY movement signals 161 as described above.

In one embodiment, light source 2 is controlled by shutter signal 308 from shutter controller 164. Shutter signal 308 is shown in FIG. 3 below frame period 300. When shutter signal 308 goes high, the high signal causes light controller 166 to turn on light source 2. The high shutter signal 308 also causes electronic shutter 150 to open, thereby allowing charge to accumulate on sense capacitors 154. When shutter signal 308 goes low, the low signal causes light controller 166 to turn off light source 2, and causes electronic shutter 150 to close.

In one embodiment, in addition to generating ΔX, ΔY movement information 161, correlator 160 also calculates velocity data 163, which is output to system controller 162. The velocity data 163 indicates the speed of movement of optical mouse 10 relative to imaging surface 6. In one form of the invention, the velocity data 163 is determined by correlator 160 based on the calculated amount of movement between image frames, and the difference in time at which the image frames were captured. In one form of the invention, in a full power mode, system controller 162 varies the rate at which images are captured (and correspondingly the rate at which light source 2 is flashed) based on the velocity data 163. In one embodiment, slow user motions result in lower frame rates, which causes less power consumption from the battery or other power source (not shown). Since the supply current is a strong function of the frame rate, and since rapid mouse motions are infrequent, even in intense usages like computer games, adjusting the frame rate based on velocity as done in one embodiment of the present invention provides a one-half or more reduction in power consumption compared to prior optical motion sensors.

In selecting a velocity to frame rate relation, it is important to consider the acceleration capability of the optical mouse 10. An optical mouse should be able to continue tracking during unexpected velocity increases (acceleration) up to a certain level. Since the acceleration capability is roughly proportional to the square of the frame rate, a minimum bound on the frame rate is used in one form of the invention. In one embodiment, acceleration data are also output by correlator 160 to system controller 162, which adjusts the frame rate based on the velocity and acceleration of mouse 10.

Figure 4:
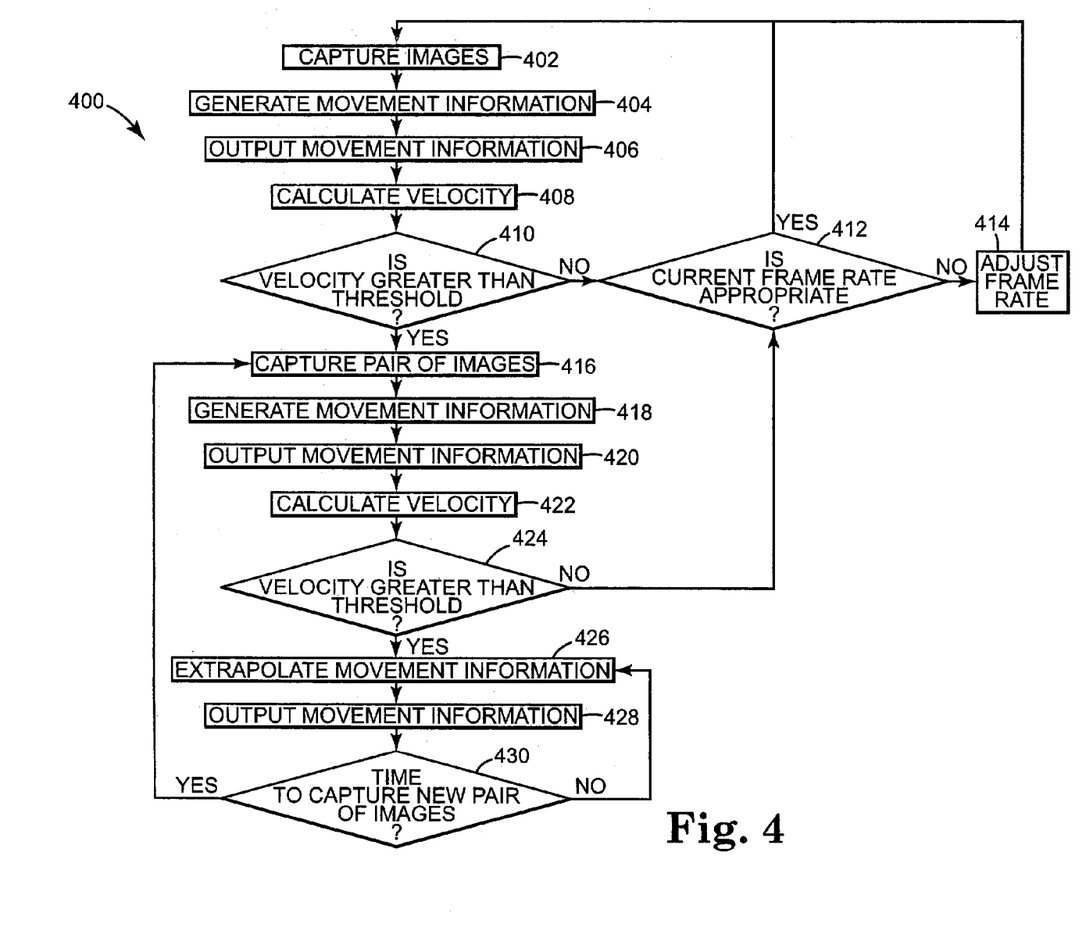
FIG. 4 is a flow diagram illustrating a method for generating movement information with the optical mouse shown in FIG. 1 using a velocity-based variable frame rate according to one embodiment of the present invention.

FIG. 4 is a flow diagram illustrating a method 400 for generating ΔX, ΔY movement information with mouse 10 using a velocity-based variable frame rate according to one embodiment of the present invention. In step 402, motion sensor 16 captures images at a beginning frame rate, such as one image every 10 milliseconds. In step 404, correlator 160 generates ΔX, ΔY movement information 161 based on a correlation of the captured images. In step 406, correlator 160 outputs the movement information 161 to a host device (not shown). In step 408, correlator 160 calculates a current velocity of mouse 10 based on the captured images, and outputs corresponding velocity data 163 to system controller 162.

In step 410, system controller 162 determines, based on the velocity data 163, whether the current velocity of mouse 10 is greater than a threshold value. In one embodiment, the threshold value represents a velocity that is near the upper limit that can be tracked by mouse 10. If the current velocity is not greater than the threshold value, the method moves to step 412. In step 412, system controller 162 determines whether the current frame rate is appropriate for the current velocity of mouse 10. If it is determined in step 412 that the current frame rate is appropriate, the method returns to step 402.

If it is determined in step 412 that the current frame rate is not appropriate, the frame rate is adjusted in step 414, and the method returns to step 402. In one embodiment, when the velocity data 163 indicates that optical mouse 10 is being moved relatively slowly, system controller 162 causes images to be acquired at a relatively slow rate (e.g., about every ten milliseconds). And when the velocity data 163 indicates that the speed of movement of mouse 10 is increasing, system controller 162 causes intermediate images to be acquired, such that the interval between acquired images is short enough to assure correlation (i.e., to assure that common elements appear in consecutively captured images). In one embodiment, the frame rate is adjusted by controller 162 in step 414 so that about a two pixel movement between image frames will result from the most recently observed velocity. For example, assuming a pixel size of sixty micrometers, a slow motion of 0.5 inches per second would result in a frame rate of about one hundred frames per second.

If it is determined in step 410 that the current velocity is greater than the threshold value, the method moves to step 416. In step 416, motion sensor 16 captures a pair of images. In one embodiment, the pair of images are captured relatively close together in time (e.g., 0.5 milliseconds apart). In step 418, correlator 160 generates ΔX, ΔY movement information 161 based on a correlation of the pair of captured images. In step 420, correlator 160 outputs the movement information 161 to a host device. In step 422, correlator 160 calculates a current velocity of mouse 10 based on the pair of captured images, and outputs corresponding velocity data 163 to system controller 162.

In step 424, system controller 162 determines whether the current velocity of mouse 10 is greater than a threshold value. In one embodiment, the threshold value used in step 424 is the same as the threshold value used in step 410. If the current velocity is not greater than the threshold value, the method returns to step 412.

If it is determined in step 424 that the current velocity is greater than the threshold value, the method moves to step 426. In step 426, system controller 162 extrapolates ΔX, ΔY movement information 165 based on previously determined movement information 161 and velocity data 163. In step 428, the extrapolated movement information 165 is output to the host device. In step 430, system controller 162 determines whether it is an appropriate time to capture a new pair of images. In one embodiment, a pair of images are captured every ten milliseconds, and motion information is output every two milliseconds. Thus, for this embodiment, if it is determined in step 430 that ten milliseconds have not yet expired from the time that the pair of images were captured in step 416, the method returns to step 426 to extrapolate (step 426) and output (step 428) additional movement information 165. If it is determined in step 430 that it is an appropriate time to capture a new pair of images (e.g., ten milliseconds have passed), the method returns to step 416 to capture a new pair of images.

To summarize steps 416–430, when the velocity data 163 indicates that the speed of movement of mouse 10 is relatively high (e.g., approaching the upper limit that can be tracked by mouse 10), in one embodiment, controller 162 causes pairs of images to be acquired at about 0.5 milliseconds apart, with an interval or delay period between each pair of images of about ten milliseconds. If movement information is reported to the host device every two milliseconds, every fifth report will include movement information 161 based on a correlation of the captured pair of images, and the intervening reports will include movement information 165 generated from extrapolation.

When an optical mouse is moved at high velocities, positional accuracy is not as important as it is at lower velocities. Even if there are minor errors in position at high velocities, the errors will not likely be noticeable to the human eye. In some optical mice, excess power is consumed by capturing more images, using more light, and performing more processing than is necessary to obtain an appropriate level of positional accuracy for high velocity mouse movements. Since light source 2 is turned on only when an image is acquired in one form of the invention, by capturing pairs of images with a ten millisecond separation between each pair during high velocity movements, the light source 2 is flashed two hundred times a second, as opposed to previous optical mice that flash the light source at a constant 1500 times a second regardless of the speed of the mouse movement. The decreased number of images to be processed and the lesser number of flashes of the light source 2 provide significant power savings.

In one embodiment, optical motion sensor 16 captures digital images in pairs for all velocities of mouse 10, with a constant intra-pair time delay between the time of capture of the first and second images in each pair, and with an inter-pair time delay between the capture of each pair that is varied based on a current velocity of mouse 10. In another embodiment, the intra-pair time delay is also varied based on a current velocity of mouse 10. In one embodiment, the inter-pair time delay is greater than the intra-pair time delay. In one form of the invention, the intra-pair time delay is $1/3000$ of a second, and the inter-pair time delay varies from a minimum of about eight milliseconds for high velocities of mouse 10 and is gradually increased as the velocity of mouse 10 decreases.

In one embodiment, the sampling of images by optical motion sensor 16 is syncopated, with the distance traveled during the inter-pair time delays (also referred to as the major intervals) being computed from the distance covered during the intra-pair time delays (also referred to as the minor intervals) and the elapsed time (i.e., computed from minor interval velocities). In one embodiment, motion sensor 16 interpolates position points during the major intervals.

In one embodiment, optical motion sensor 16 identifies digital images to use for generating movement data based on a current velocity of mouse 10. In one form of the invention, the optical motion sensor 16 generates movement data based on differences between the two digital images in a pair when the current velocity is high, and generates the movement data based on differences between a digital image in a first pair with a digital image in a second pair when the current relative velocity is low.

In one embodiment, when sensor 16 is in a low power mode, additional power savings are provided by analyzing only a single pixel or photo detector in array 148, as opposed to a full image frame, to determine if any motion has occurred. In one form of the invention, in a low power mode, system controller 162 sends a control signal to multiplexer 156, causing multiplexer 156 to output the signal accumulated from a single pixel in sensor array 148 to amplifier 157. The signal from the single pixel is amplified by amplifier 157 and converted to a digital signal by A/D converter 158. Correlator 160 compares the digital value for the pixel with one or more previously determined values for the pixel to determine if any motion has occurred. A movement of mouse 10 during a low power mode will cause a change in the single pixel, which is detected by correlator 160. In one embodiment, correlator 160 compares the change in value for the pixel to a threshold value, and determines that movement has occurred if the change in the value for the pixel is greater than the threshold. Setting an appropriate value for the threshold involves a tradeoff between noise on a given pixel, and reliable detection of motion on low contrast surfaces. In another embodiment, more than one pixel is used to detect motion in a low power mode. As long as the number of pixels used in the low power mode is less than the number of pixels used in the full power mode, a reduction in power consumption can be obtained.

In one embodiment, optical motion sensor 16 is implemented in an optical mouse for a desktop personal computer, workstation, portable computer, or other device. In another embodiment, optical motion sensor 16 may also be implemented in an optical trackball, an optical fingerprint sensing pointing device, or other pointing device.

It will be understood by a person of ordinary skill in the art that functions performed by optical motion sensor 16 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

One form of the present invention provides an optical screen pointing device with more power savings in low power mode and full power mode than prior art optical pointing devices. In one embodiment, in full power mode, image acquisitions are captured on an irregular basis, and the timing of the image acquisitions is intelligently chosen to minimize power consumption. In one embodiment, in a low power mode, a single pixel in the photo detector array is analyzed to determine if motion has occurred, rather than processing an entire frame of image data as done in prior optical pointing devices. The power savings provided by embodiments of the present invention provide for longer battery life in battery-operated pointing devices, and/or the ability to use smaller batteries.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for controlling the position of a screen pointer for an electronic device having a display screen, the apparatus comprising:
   a light source for illuminating an imaging surface, thereby generating reflected images; and
   an optical motion sensor for generating digital images from the reflected images at a first frame rate, the motion sensor configured to generate movement data for controlling the position of a screen pointer based on the digital images, the movement data indicative of relative motion between the imaging surface and the apparatus, the motion sensor configured to modify the first frame rate to one of a plurality of alternate frame rates based on a current relative velocity between the imaging surface and the apparatus.

2. The apparatus of claim 1, wherein the optical motion sensor is configured to turn the light source on and off at a flash rate corresponding to the first frame rate.

3. The apparatus of claim 1, wherein the optical motion sensor is configured to calculate the current velocity based on the digital images.

4. The apparatus of claim 1, wherein the optical motion sensor is configured to increase the frame rate as the current velocity increases, and decrease the frame rate as the current velocity decreases.

5. The apparatus of claim 1, wherein the optical motion sensor is configured to generate a plurality of pairs of digital images from the reflected images with a delay period between the generation of each pair.

6. The apparatus of claim 5, wherein the optical motion sensor is configured to generate the plurality of pairs of digital images when the current velocity is relatively high.

7. The apparatus of claim 5, wherein the two digital images in each pair are generated about 0.5 milliseconds apart.

8. The apparatus of claim 7, wherein the delay period between the generation of each pair is about 10 milliseconds.

9. The apparatus of claim 5, wherein the optical motion sensor is configured to generate actual movement data by correlating the two digital images in each pair.

10. The apparatus of claim 9, wherein the optical motion sensor is configured to generate extrapolated movement data during the delay period.

11. The apparatus of claim 1, wherein the apparatus is an optical mouse.

12. The apparatus of claim 1, wherein the apparatus includes a low power mode and a full power mode, the apparatus configured to automatically enter the low power mode after a period of inactivity, and wherein the motion sensor is configured to generate digital images with a lesser number of pixels in the low power mode than the full power mode.

13. The apparatus of claim 12, wherein the motion sensor is configured to generate single pixel digital images in the low power mode, and wherein the motion sensor is configured to detect whether motion of the apparatus has occurred in the low power mode based on a comparison of single pixel digital images.

14. A method for generating movement data for controlling the position of a screen pointer for an electronic device having a display screen, the method comprising:

directing light from a light source onto an imaging surface, thereby generating reflected images;

focusing the reflected images onto an array of photo detectors;

digitizing output signals of the photo detectors, thereby generating digital representations of the reflected images;

correlating the digital representations to generate motion data indicative of relative motion between the imaging surface and the array of photo detectors for controlling a position of a screen pointer; and adjusting the rate at which the digital representations are generated based on a current relative non-zero velocity between the imaging surface and the array of photo detectors.

15. The method of claim 14, and further comprising:
turning the light source on and off at a first flash rate; and
adjusting the flash rate based on the current velocity between the imaging surface and the array of photo detectors.

16. The method of claim 14, and further comprising:
generating velocity data based on the digital representations of the reflected images, the velocity data indicative of the current relative velocity between the imaging surface and the array of photo detectors.

17. The method of claim 14, and further comprising:
increasing the rate at which the digital representations are generated as the current relative velocity increases; and
decreasing the rate at which the digital representations are generated as the current relative velocity decreases.

18. The method of claim 14, and further comprising:
generating a plurality of pairs of digital representations of the reflected images with a delay period between the generation of each pair;
correlating each pair of digital representations to generate motion data indicative of relative motion between the imaging surface and the array of photo detectors; and
extrapolating motion data during the delay period.

19. The method of claim 14, and further comprising:
providing a low power mode and a full power mode;
entering the low power mode during periods of inactivity; and
generating digital representations of the reflected images with a lesser number of pixels in the low power mode than the full power mode; and
detecting whether relative motion between the imaging surface and the array of photo detectors has occurred in the low power mode based on the reflected images with a lesser number of pixels.

20. An optical pointing device for generating movement data for controlling the position of a screen pointer, the optical pointing device including a low power mode and a full power mode, the apparatus comprising:

a light source for illuminating an imaging surface, thereby generating reflected images;

a photo detector array for generating image data based on the reflected images;

a controller for capturing the image data at a first capture rate, generating digital images based on the captured image data, generating movement data based on the digital images, the movement data indicative of relative motion between the imaging surface and the optical pointing device, the controller configured to cause the device to enter the low power mode after a period of inactivity, and wherein the controller is configured to generate digital images with a lesser number of pixels in the low power mode than the full power mode.

21. The optical pointing device of claim 20, wherein the controller is configured to modify the first capture rate based on a current relative velocity between the imaging surface and the optical pointing device.

22. An apparatus for controlling the position of a screen pointer for an electronic device having a display screen, the apparatus comprising:

a light source for illuminating an imaging surface, thereby generating reflected images; and an optical motion sensor for generating a plurality of pairs of digital images from the reflected images with an intra-pair time delay between the generation of the individual digital images in each pair, and with an inter-pair time delay between the generation of each pair, wherein the inter-pair time delay is greater than the intra-pair time delay, the motion sensor configured to generate movement data based on the digital images, the movement data indicative of relative motion between the imaging surface and the apparatus.

23. The apparatus of claim 22, wherein the optical motion sensor is configured to identify generated digital images to use for generating the movement data based on a current relative velocity between the imaging surface and the apparatus.

24. The apparatus of claim 23, wherein the optical motion sensor is configured to generate the movement data based on differences between individual digital images in a pair when the current relative velocity is high.

25. The apparatus of claim 23, wherein the optical motion sensor is configured to generate the movement data based on differences between a digital image in a first pair with a digital image in a second pair when the current relative velocity is low.

* * * * *